United States Patent
Rodriguez et al.

(10) Patent No.: US 6,728,028 B1
(45) Date of Patent: Apr. 27, 2004

(54) LOW NOISE FIGURE OPTICAL AMPLIFIER FOR DWDM SYSTEMS WITH PER SUB-BAND POWER CONTROL

(75) Inventors: Fransisco Martinez Rodriguez, Oggiono (IT); Marco Mazzini, Milan (IT); Sara Gabba, Voghera (IT)

(73) Assignee: Cisco Technology, Inc., San Jose, CA (US)

( * ) Notice: Subject to any disclaimer, the term of this patent is extended or adjusted under 35 U.S.C. 154(b) by 114 days.

(21) Appl. No.: 09/918,633

(22) Filed: Jul. 30, 2001

(51) Int. Cl.[7] .............................. H01S 3/30; G02B 6/26
(52) U.S. Cl. ........................... 359/341.32; 359/341.33; 359/134; 359/160
(58) Field of Search ........................... 359/341, 341.32, 359/341.33, 334, 134, 160

(56) References Cited

U.S. PATENT DOCUMENTS

| | | | | |
|---|---|---|---|---|
| 5,430,572 A | * | 7/1995 | DiGiovanni et al. | 359/341 |
| 5,801,878 A | * | 9/1998 | Bourret et al. | 359/341 |
| 5,808,786 A | * | 9/1998 | Shibuya | 359/341 |
| 6,151,160 A | * | 11/2000 | Ma et al. | 359/341 |
| 6,259,555 B1 | | 7/2001 | Meli et al. | 359/337 |
| 6,310,716 B1 | * | 10/2001 | Evans et al. | 359/334 |
| 6,396,623 B1 | * | 5/2002 | Wysocki et al. | 359/337.4 |
| 6,424,459 B1 | * | 7/2002 | Yokota | 359/341.42 |
| 6,493,133 B1 | * | 12/2002 | Liang et al. | 359/349 |

OTHER PUBLICATIONS

U.S. Patent Application entitled, "Optical demultiplexer with multi-channel power control and tilt compensation," by Gianpaolo Barozzi, Cinzia Ferrari and Stefano Piciaccia. Filed May 24, 2001, assigned 09/865,917.

U.S. Patent Application entitled, "Ribbon amplifier for optical demultiplexer," by Stefano Piciaccia, Cinzia Ferrari, and Gianfranco Mozzati. Filed May 31, 2001, assigned 09/872, 057.

U.S. Patent Application entitled, "Shared variable gain amplifier for wdm channel equalization," by Fausto Meli, Roberta Castagnetti, and Giorgio Grasso. Filed Jun. 6, 2001, assigned 09/876,533.

U.S. Patent Application entitled, "Chromatic dispersion compensation by sub-band," by Marco Mazzini and Federico Carniel. Filed Jul. 17, 2001, assigned 09/908,109.

Faleano et al, 1995 IZCK General Conference pp 513 2 page translation, Mar. 1995.*

Yaunada et al, 03A tops, vol. 16, pp14–29, 1997.*

* cited by examiner

Primary Examiner—Nelson Moskowitz
(74) Attorney, Agent, or Firm—Ritter, Lang & Kaplan LLP

(57) ABSTRACT

Improved systems and methods for optical amplification of WDM signals are provided. Multiple sub-bands of a WDM signal are amplified in a first common amplification stage and separated from one another. The separated sub-bands are amplified by independent parallel amplification stages. Each of the independent parallel amplification stages is equipped with a corresponding optical pump energy source. Furthermore, all of these optical pump energy sources together also provide the pump energy for the first common amplification stage. This architecture provides low noise figure and independent power regulation for each of the sub-bands while employing only N−1 pump energy sources for N amplification stages, thus greatly reducing space requirements and cost.

20 Claims, 4 Drawing Sheets

LOW NOISE FIGURE OPTICAL AMPLIFIER FOR DWDM SYSTEMS WITH PER SUB-BAND POWER CONTROL

BACKGROUND OF THE INVENTION

The present invention relates to optical communication systems and more particularly to systems and methods for amplifying wavelength-division-multiplexed (WDM) signals.

The explosion of communication services, ranging from video teleconferencing to electronic commerce has spawned a new era of personal and business interactions. As evident in the rapid growth of internet traffic, consumers and businesses have embraced broadband services, viewing them as a necessity. However, this enormous growth in traffic challenges the telecommunication industry to develop technology that will greatly expand the bandwidth of communication networks. Further improvements in optical communications hold great promise to meet the demand for greater bandwidth.

Wavelength division multiplexing (WDM) technology permits the concurrent transmission of multiple channels over a common optical fiber, thus expanding available bandwidth and providing other advantages in implementation. In a WDM link between two points, it may be necessary to amplify the WDM signal at various locations. For example, amplification may be required at the transmitter, the receiver, or at intermediate points along the link.

It is desirable in certain situations to amplify and control power of sub-bands of the WDM signal independently. To assure effective automatic power control operation on each of the sub-bands, it is important that there be low crosstalk between the sub-bands. Furthermore, to assure optimal communication performance, it is desirable that the optical amplification system exhibit a low noise figure, i.e., output signal to noise ratio over input signal to noise ratio. It is further desirable that loss of amplifier input be independently detected for each sub-band so that automatic shutdown safety features may be correctly implemented. Other desirable features include ease of expandability to accommodate adding extra groups of WDM channels to existing systems and minimum volume consumption for the amplification system packaging.

FIG. 1 depicts an optical amplification system 100 according to one prior art approach. The design of FIG. 1 is intended for a C-band WDM system where there are multiple WDM channels to be amplified. This C-band is divided into two sub-bands, which require separate power control: a "red" band (1540–1560 nm) and a "blue" band (1529–1535 nm). Both the red and blue bands are amplified within a first amplification stage 102 that is pumped in a co-propagating mode by a pump laser 104. The red band is separated from the blue band by a band separator 106 and then amplified within a second amplification stage 108. Second amplification stage 108 is also pumped by pump laser 104 but in a counter-propagating mode.

Monitoring of the input signal is achieved by photodiode 110. Monitoring of the blue band and red band amplified outputs is achieved by photodiodes 112 and 114 respectively.

Other components of optical amplification system 100 are included to appropriately filter and direct the various optical signals. A wavelength selective filter 116 separates the LSM (Line Service Modem) signals at 1480 nm and 1510 nm from the C band signals. The LSM signals carry various telemetry information. A tap coupler 118 removes a small portion of the C band signal for monitoring by photodiode 110. An isolator 120 suppresses undesired oscillation within first amplification stage 102.

A wavelength-selective filter 122 combines the pump laser energy with the C-band signal for input to the active fiber that implements first amplification stage 102. A tap coupler 124 taps off a small portion of the output of pump laser 104 for monitoring by photodiode 126. A wavelength-selective filter 128 separates the pump energy from the amplified C band signal.

The C band signal passes through an isolator 130 into band separator 106 while the pump energy is coupled into the active fiber implementing second optical amplification stage 108 by a wavelength-selective filter 132. A small portion of the blue band signal is tapped off by a coupler 134. A splitter 136 divides the blue band monitor signal between photodiode 112 and a monitor output. Similarly for the red band, a tap coupler 138 separates out of a portion of the red band signal for monitoring purposes. The red band monitor signal is split by a splitter 140 into one component that is input to photodiode 114 and another component that is presented at a red band monitor output.

This design fails to achieve many of the objectives given above for a WDM optical amplification system. The only way to regulate output power for either the red band or the blue band is by controlling pump current to pump laser 104. However, reducing the output of pump laser 104 to control red band output power will also have the effect of reducing blue band output power since pump laser 104 is also the pump energy source for first amplification stage 102 that amplifies both bands. Furthermore, if pump laser 104 is adjusted to regulate the blue band output power not only will red band output power be affected but also red band noise figure will be changed because of the reduction of gain in the first stage. Another obstacle to correct automatic power control is that band separator 106 is insufficient to provide good isolation between the red band and blue band signals so that in fact the blue path incorporates some red band energy or vice versa due to the limitations of filter technology. Thus, blue band power regulation will be based in part on extraneous red band energy and vice versa.

Another drawback is that photodiode 110 cannot separately detect the failure of the blue and red bands. It has also been found that optical amplification system 100 provides insufficient noise figure performance for certain applications.

What is needed are systems and methods for optical amplification that meet all of the objectives described above while permitting implementation within a small package.

SUMMARY OF THE INVENTION

Improved systems and methods for optical amplification of WDM signals are provided by virtue of one embodiment of the present invention. Multiple sub-bands of a WDM signal are amplified in a first common amplification stage. The sub-bands are separated from one another and amplified by independent parallel amplification stages. Each of the independent parallel amplification stages is equipped with a corresponding optical pump energy source. Furthermore, all of these optical pump energy sources together also provide the pump energy for the first common amplification stage. This architecture provides low noise figure and independent power regulation for each of the sub-bands while employing only N−1 pump energy sources for N amplification stages, thus greatly reducing space requirements and cost.

A first aspect of the present invention provides apparatus for amplifying a WDM signal. The apparatus includes: a first amplification stage that amplifies the WDM signal, an optical filter structure that separates the WDM signal into at least first and second sub-bands, a second amplification stage that amplifies the first sub-band and not other components of the WDM signal and that is pumped by a first pump, and a third amplification stage that amplifies the second sub-band and not other components of the WDM signal and that is pumped by a second pump. The first pump and the second pump contribute pump energy to the first amplification stage.

A second aspect of the present invention provides apparatus for amplifying a WDM signal. The apparatus includes N amplification stages. The N amplification stages include: a first amplification stage that amplifies a plurality of components of the WDM signal and N−1 amplification stages each associated with a sub-band of the WDM signal, each amplifying only the associated sub-band of the WDM signal after amplification by the first amplification stage. The apparatus further includes N−1 pumps where each provides pump energy to an associated one of the N−1 amplification stages. All N−1 pumps also contribute pump energy to the first amplification stage.

Further understanding of the nature and advantages of the inventions herein may be realized by reference to the remaining portions of the specifications and the attached drawings.

DESCRIPTION OF SPECIFIC EMBODIMENTS

One embodiment of the present invention is directed towards an optical amplification architecture for use in a WDM system where multiple optical signals are multiplexed within the same fiber on different wavelengths. In a typical WDM system, a WDM transmitter site multiplexes multiple optical signals onto the same fiber, and then amplifies this combined WDM signal for transmission across a link to a WDM receiver. The link may include multiple spans with optical amplification between spans. It is also typical that the WDM receiver site amplifies the WDM signal prior to demultiplexing the multiple optical signals onto separate fibers. A WDM amplification system according to the present invention may find application at many different sites, e.g., the transmitter, the receiver, or within the link.

The WDM signal may include numerous channels, e.g., 50 channels, 100 channels, 200 channels, etc. These may be divided into two or more sub-bands. To assure proper receiver operation, compensate for various wavelength-selective effects, etc., it may be desirable to regulate the amplifier output power of each sub-band individually. This may be accomplished by the amplification architecture provided by the present invention.

Figure 2:
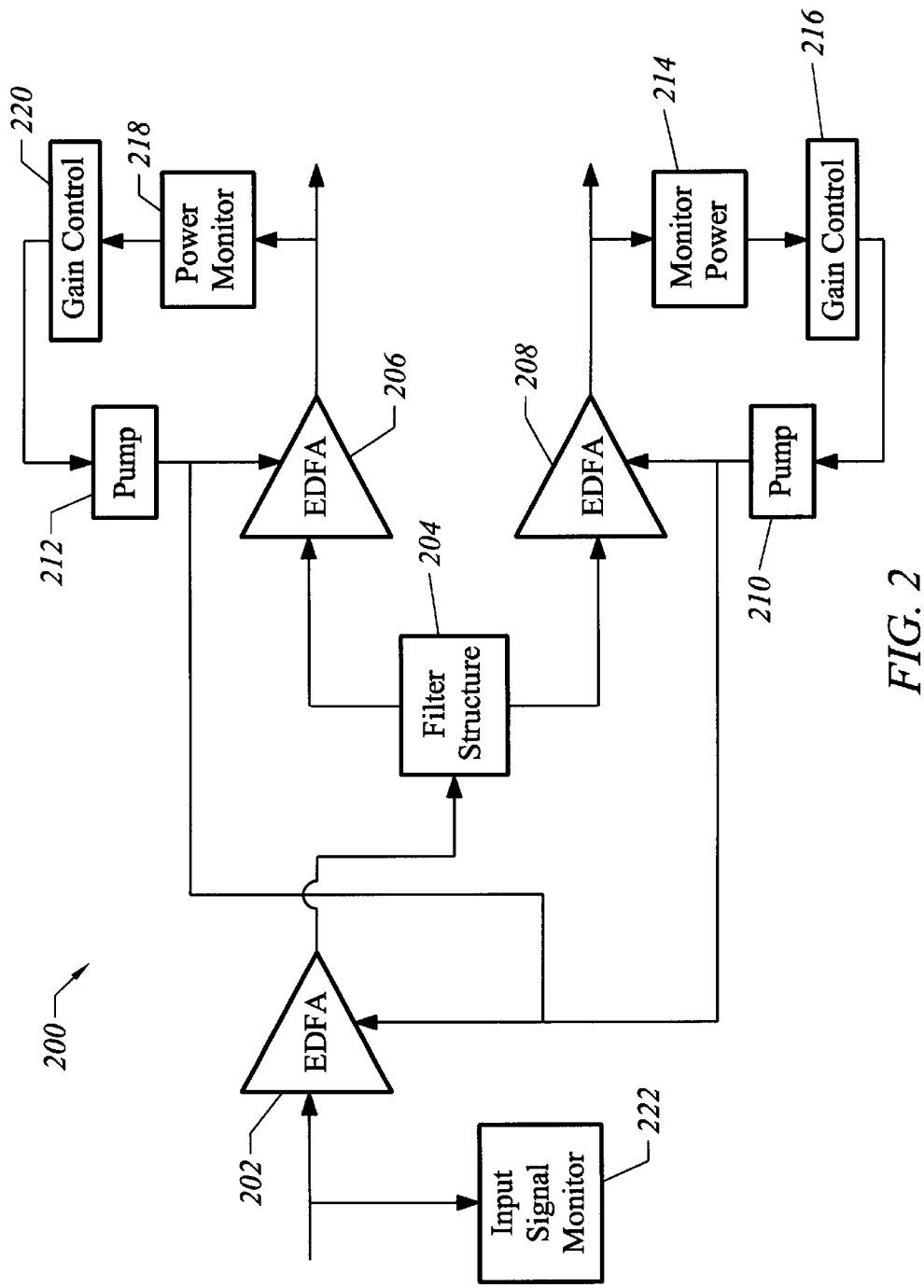
FIG. 2 is a top-level diagram of an optical amplification architecture according to one embodiment of the present invention.

FIG. 2 is a top-level diagram of an optical amplification system 200 according to one embodiment of the present invention. Optical amplification system 200 is illustrated with reference to separate power regulation of two sub-bands but the same architecture may be readily extended to three or more sub-bands. An erbium-doped fiber amplifier (EDFA) 202 amplifies all components of a WDM signal. A filter structure 204 substantially separates the WDM signal into two sub-bands. A first sub-band is further amplified by an EDFA 206. A second sub-band is further amplified by an EDFA 208. Associated with EDFA 208 is a laser pump 210. Laser pump 210 provides the optical pump energy for EDFA 208. Similarly, there is a pump 212 which provides the pump energy for EDFA 206. Furthermore, pump 210 and pump 212 together supply the pump energy for EDFA 202. It should be noted that although the present invention is being illustrated with reference to EDFAs, other optical amplification technologies may also be used to implement the present invention.

To simplify the description, the sub-band passing through EDFA 208 shall be referred to as the "A" sub-band and the sub-band passing through EDFA 206 will be referred to as the "B" sub-band. Power regulation for the A sub-band is provided by a power monitor 214 that monitors the output power level of EDFA 208. A gain control element 216 then regulates the output power of EDFA 208 to a desired level by varying the output power of pump 210. Similarly, a power monitor 218 monitors the output power of EDFA 206 to assist in regulation of the B sub-band output power. A gain control block 220 sets the output power of pump 212 so that the output of EDFA 206 is brought within a desired range.

It will be appreciated that although three amplification stages are depicted, there are only two pumps needed. This feature greatly reduces the volume and cost of optical amplification system 200. It will be appreciated that the number of pumps will be equal to the number of sub-bands if the architecture is extended to more than two sub-bands and that for N amplification stages only N−1 pumps are required.

Furthermore, this architecture achieves independent power regulation on each of the sub-bands. Gain control blocks 220 and 216 adjust the gains of EDFAs 206 and 208 respectively by varying the output power of the associated pumps. This is, however, a relatively slow adjustment with loop bandwidths on the order of 20–25 Hz. Although both pump 210 and pump 212 provide the pump energy to common EDFA 202, control loop-generated crosstalk is substantially eliminated. This is because if one of the pumps changes output power in order to regulate its sub-band, there is sufficient time for the other pump to adjust the gain for its own sub-band for any output power changes caused by increase or decrease of overall pump energy to EDFA 202.

An input signal monitor 222 is provided to separately monitor both sub-bands. If input is lost on a particular sub-band, the pump for that sub-band may be shut down, but again relatively slowly to allow the other pump to maintain first amplification stage stability.

It should be noted that this architecture is inherently modular. After an initial installation, an extra band may be added by adding the necessary components for an additional amplification stage that will follow the first stage including a laser pump that will also contribute to pumping of the first stage. Filter structure 204 is also modified to also provide an output providing only the signal energy on the newly added band.

Figure 1:
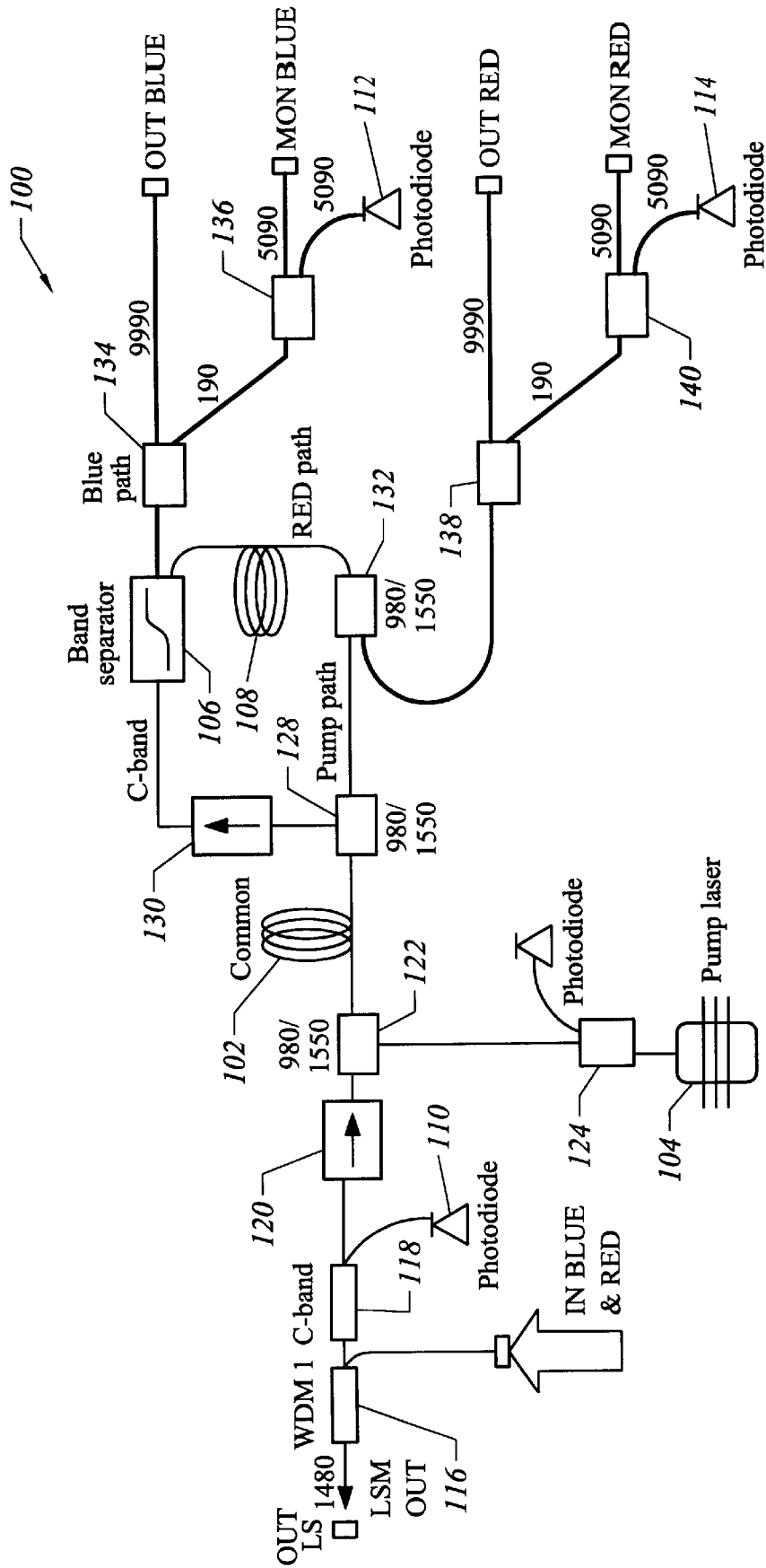
FIG. 1 depicts a prior art optical amplification architecture.
Figure 3:
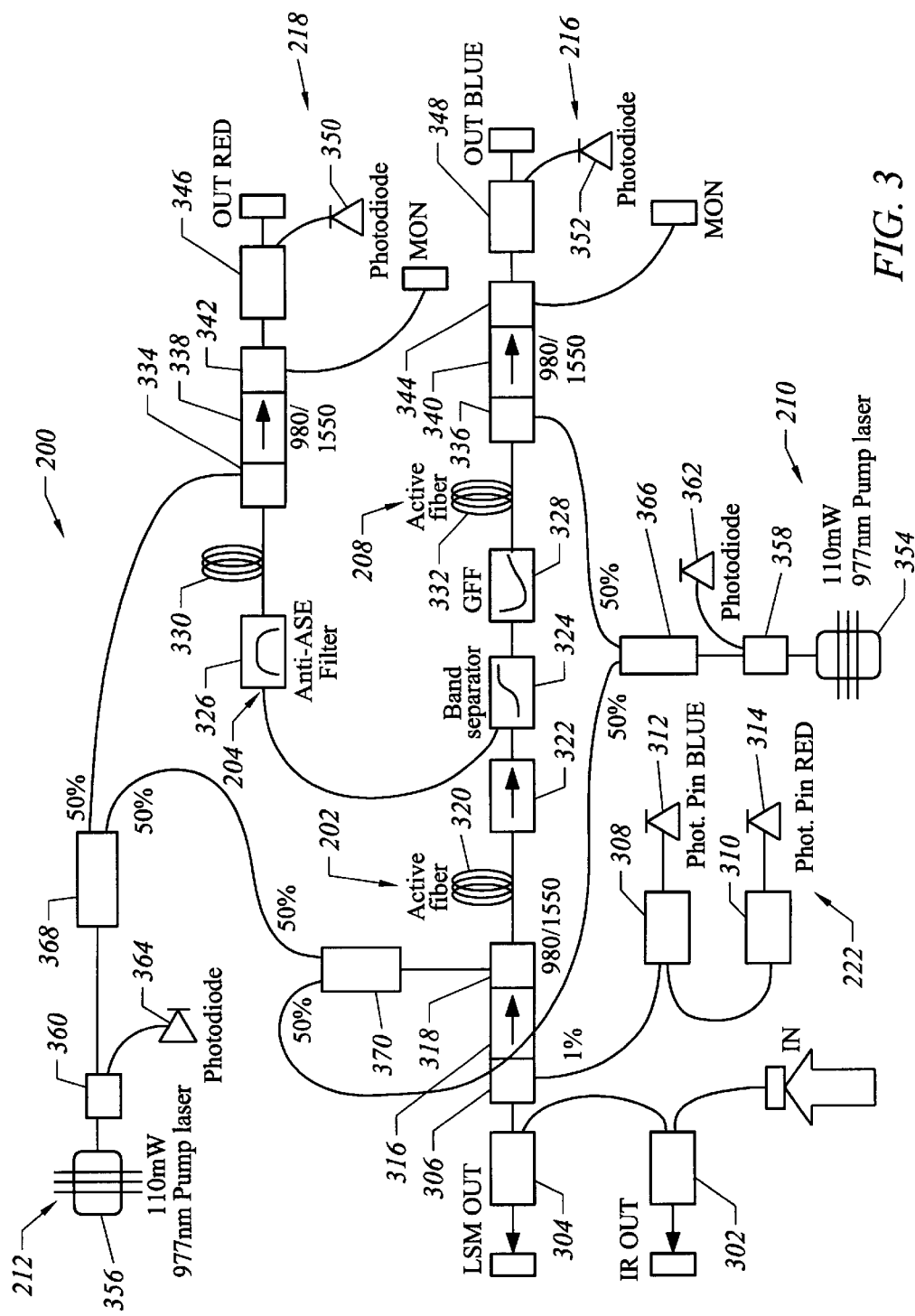
FIG. 3 is a detailed drawing of an optical amplification architecture wherein two sub-bands may have separate power regulation according to one embodiment of the present invention.

FIG. 3 depicts details of a particular embodiment of optical amplification system 200. In FIG. 3, optical amplification system 200 has been configured for use in a WDM system where multiple WDM channels in the C band are divided into red and blue sub-bands as was described above in reference to FIG. 1. A wavelength-selective filter 302 separates out IR signals and a wavelength-selective filter 304 separates out an LSM signal. If IR wavelengths are used, they are processed by components (not shown) coupled to wavelength-selective filter 302. The capability of splitting wavelengths off at this point provides additional modularity. A tap coupler 306 splits off 1% of the C-band input signal power for use by input signal monitor 222. Input signal monitor 222 includes wavelength-selective filters 308 and 310 for separating out blue band and red band monitoring signals respectively. These monitoring signals are converted to electrical form by photodiodes 312 and 314, respectively. The electrical signals are then processed by line monitoring circuits and software (not shown).

An isolator 316 follows tap coupler 306 and isolates the first amplification stage from the various input components and suppresses any back-propagation of the amplified signal towards the input. A wavelength-selective filter 318 combines the pump energy for amplifier 202 with the C band signal. EDFA 202 is implemented by this injection of co-propagating optical pump energy into an active fiber 320. Active fiber 320 is followed by a further isolator 322 to avoid cavity oscillation due to ASE (amplified stimulated emissions) reflections.

Optical filter structure 204 is implemented as a combination of a band separator 324, an anti-ASE filter 326, and a gain-flattening filter (GFF) 328. In one embodiment, band separator 324 is an interferential filter. Gain flattening filter 328 is used to correct for gain tilt expected in the blue band due to frequency-selective effects, amplifier gain tilt, extra attenuation introduced by chromatic dispersion correcting components, etc. Anti-ASE filter 326 suppresses residual blue band energy, increasing the isolation between the bands. EDFA 206 is implemented by counter-propagating optical pump energy into an active fiber 330. Similarly, amplifier 208 is implemented by counter-propagating optical energy into an active fiber 332. Wavelength-selective filters 334 and 336 couple the pump signals into the active fibers. Following the tap couplers 334 and 336 are isolators 338 and 340 for eliminating cavity oscillation due to ASE reflections. Tap couplers 342 and 344 then split off monitor signals for the red and blue channels respectively for unit debugging and monitoring.

Tap couplers 346 and 348 then split off the signals used by monitors 218 and 214 to measure the power of the red and blue sub-bands respectively. Power monitor 218 is implemented for the red band by a photodiode 350 and power monitor 214 for the blue band is implemented by a photodiode 352. Power monitors 218 and 214 also include further electronics to process the electrical signals generated by photodiode 350 and 352 to develop indications of current sub-band output power. Gain control blocks 220 and 216 are implemented by control instructions operating on a single microprocessor or in any other suitable way. Further details of the gain control circuits are not shown.

A laser 354 serves as the pump for the blue sub-band and a laser 356 is the pump for the red sub-band. In the depicted embodiment, both lasers 354 and 356 have nominal output powers of 110 mW and radiate at a stabilized wavelength of 977 nm. Monitoring of the pump laser output power is provided by tap couplers 358 and 360 in combination with photodiodes 362 and 364 as shown. For blue band pump laser 354, a splitter 366 splits the laser pump power between EDFAs 202 and 208. This is preferably a 50/50 split. Similarly, a splitter 368 splits the red band pump power between amplifier 206 and common amplifier 202. For common amplification stage 202, a combiner 370 combines the pump energy from the two sources.

In one embodiment, further space efficiency is provided by integration of certain optical passive components. For example, tap coupler 306, wavelength-selective filter 318 and isolator 316 may be combined in one package. Wavelength-selective filter 334, isolator 338 and tap coupler 342 may be combined in one package to form a hybrid component, as may wavelength selective coupler 336, isolator 340 and tap coupler 344. These are only representative examples of schemes for integrating the components of FIG. 3. Preferably, system 200 may be installed within a single slot of a rack.

The nominal overall gain for the system 200 is approximately 21 dB for both bands and the nominal output power may be adjusted from +4 to +13 dBm.

In one embodiment, the configuration of FIG. 3 is modified for a WDM system that combines both C band and L band transmission on the same fiber. The C band and L band are then the sub-bands of the overall WDM signal. In this embodiment, the laser pumps used radiate at a wavelength of 1480 nm and at a power level of 160 mW.

Figure 4:
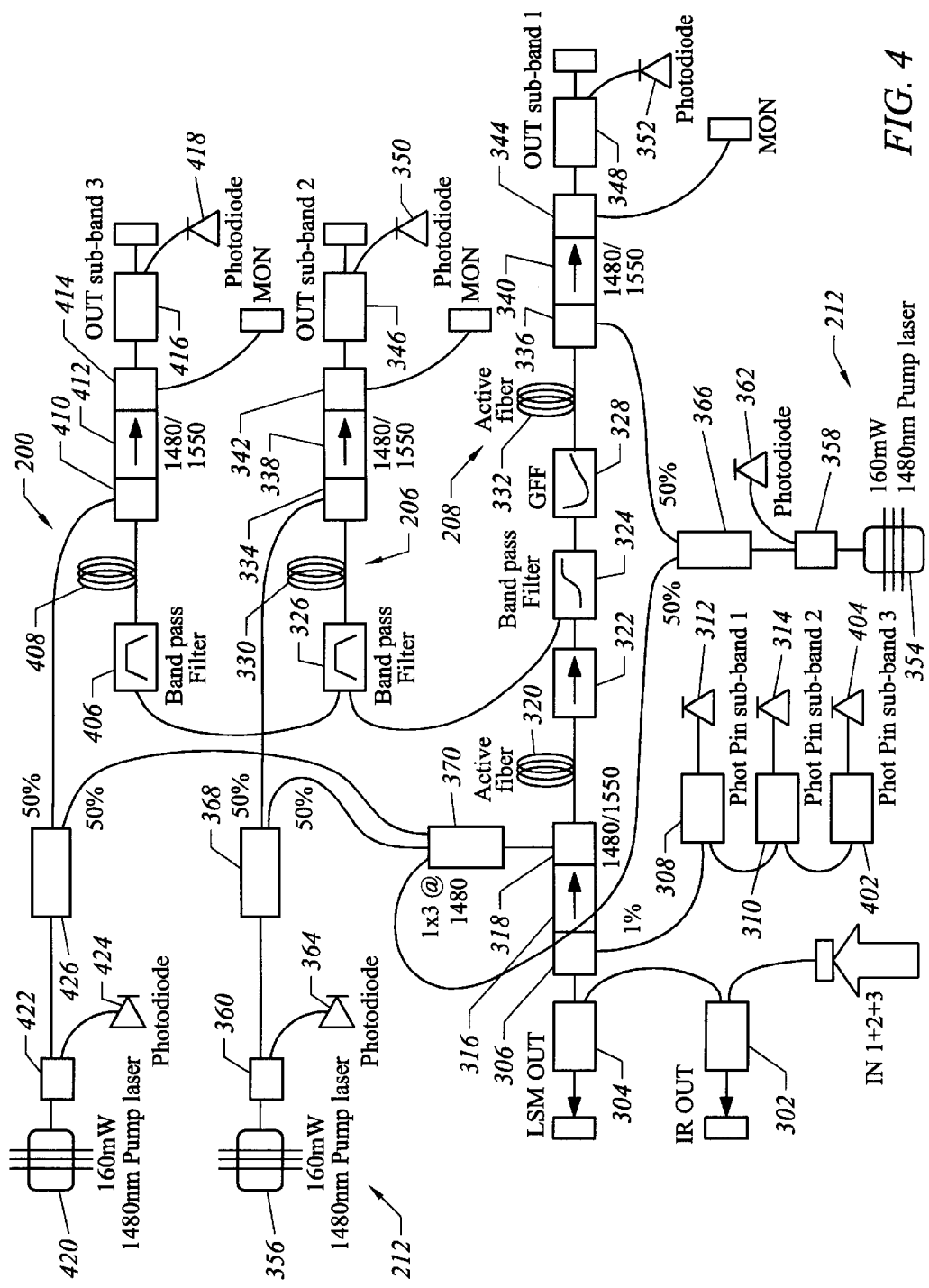
FIG. 4 depicts an implementation of an optical amplification architecture adapted for use with three sub-bands according to the present invention.

FIG. 4 depicts the configuration of FIG. 3 extended to three sub-bands according to one embodiment of the present invention. The three sub-bands are denoted as sub-band 1, sub-band 2, and sub-band 3. The components for sub-band 1 are given the same designators as the components for the blue band in FIG. 3. The components for sub-band 2 are given the same designators as the components for the red band in FIG. 3. The components common to all of the sub-bands are also given the same designators as in FIG. 3. For example, it would be possible to handle the C band, L band, and the IR (infra red band).

To accommodate sub-band 3, input signal monitor 222 incorporates additional components: an interference filter 402 and a photodiode 404. To isolate sub-band 3, optical filter structure 204 further includes a bandpass filter 406. Independent amplification for sub-band 3 is provided by an active fiber 408 into which a pump signal is coupled by a wavelength-selective coupler 410. An isolator 412 is installed to avoid cavity oscillation due to ASE reflections. A tap coupler 414 splits off the output power for monitoring purposes. A tap coupler 416 taps off a monitor signal for power monitoring by a photodiode 418. Photodiode 418 then serves as part of another power monitor block and there is also a gain control block (not shown) for the third sub-band. A pump laser 420 provides pump energy for the third sub-band. Power for monitoring the output of pump laser 420 is provided by a tap coupler 422. The power monitoring for pump 420 is performed by a photodiode 424.

A splitter 426 splits the pump power between EDFA 202 and the sub-band 3 EDFA implemented by active fiber 408. In FIG. 4, combiner 370 combines three laser pump sources to provide pump energy to EDFA 202. The principles of operation need not change substantially with the increased number of sub-bands. In the depicted example, the pump lasers have output powers of 160 mW and operate at a wavelength of 1480 nm.

It will be appreciated that one could include in an initial installation only the components depicted in FIG. 4 necessary for handling two of the sub-bands. The components needed for the third sub-band may be added when it is necessary to expand transmission capacity.

It will be seen that all of the objectives for an optical amplification system are met by embodiments according to the present invention. Good noise figure performance is achieved with a 2–3 dB improvement compared with prior art approaches to improving sub-band performance. Independent regulation is achieved for two or more sub-bands. There is independent monitoring of input power on multiple sub-bands. Furthermore, volume and cost are saved since the number of pumps may be as low as the number of sub-bands.

It is understood that the examples and embodiments that are described herein are for illustrative purposes only and various modifications are changes in light thereof will be suggested to persons skilled in the art and are to be included within the spirit and purview of this application and scope of the appended claims and their full scope of equivalents. For example, if chromatic dispersion compensation is needed, chromatic dispersion compensating components may be installed in line after the common first amplification stage.

What is claimed is:

1. In an optical communication system, apparatus for amplifying a WDM signal, said apparatus comprising:
   a first Erbium-doped fiber amplification stage that amplifies said WDM signal;
   an optical filter structure that separates said WDM signal into at least first and second sub-bands;
   a second Erbium-doped fiber amplification stage that amplifies said first sub-band and not other components of said WDM signal and that is pumped by a first pump; and
   a third Erbium-doped fiber amplification stage that amplifies said second sub-band and not other components of said WDM signal and that is pumped by a second pump; and
   wherein said first pump and said second pump contribute pump energy to said first Erbium-doped fiber amplification stage.

2. In an optical communication system, apparatus for amplifying a WDM signal, said apparatus comprising:
   N Erbium-doped fiber amplification stages, said N amplification stages comprising:
   a first Erbium-doped fiber amplification stage that amplifies a plurality of components of said WDM signal; and
   N−1 Erbium-doped fiber amplification stages, each associated with a sub-band of said WDM signal, each amplifying only said associated sub-band of said WDM signal after amplification by said first Erbium-doped fiber amplification stage; and
   N−1 pumps, each providing pump energy to an associated one of said N−1 Erbium-doped fiber amplification stages, all N−1 pumps contributing pump energy to said first Erbium-doped fiber amplification stage.

3. The apparatus of claim 2 wherein N>=3.

4. The apparatus of claim 2 further comprising a gain-flattening filter that is applied to at least one of said sub-bands.

5. The apparatus of claim 2 further comprising a signal monitor that, prior to amplification by said N Erbium-doped fiber amplification stages individually verifies reception of signals in each sub-band.

6. The apparatus of claim 5 wherein said signal monitor comprises: for each sub-band to be monitored:
   a bandpass filter that isolates said sub-band; and
   a photodiode that monitors output of said bandpass filter.

7. The apparatus of claim 2 further comprising a gain control circuit that monitors output of at least one of said N−1 Erbium-doped fiber amplification stages and controls said associated pump of said one of said N−1 Erbium-doped fiber amplification stages.

8. The apparatus of claim 2 further comprising an optical filter structure between an output of said first Erbium-doped fiber amplification stage and inputs of said N−1 Erbium-doped fiber amplification stages, said optical filter structure separating said sub-bands from one another.

9. The apparatus of claim 2 further comprising an optical filter structure preceding said first Erbium-doped fiber amplification stage that separates out components that will be processed other than through said first Erbium-doped fiber amplification stage.

10. The apparatus of claim 9 wherein said separated-out components comprise IR components.

11. In an optical communication system, a method for amplifying an optical signal, said method comprising:
   amplifying multiple sub-bands of a WDM signal in a first optical Erbium-doped fiber amplification stage;
   isolating said multiple sub-bands from one another;
   amplifying said multiple sub-bands separately using independent optical Erbium-doped fiber amplification stages for each of said sub-bands;
   providing pump energy for each of said sub-bands using a plurality of pumps that each provide pump energy to an associated one of said independent optical Erbium-doped fiber amplification stages, all of said plurality of pumps contributing pump energy to said first optical Erbium-doped fiber amplification stage.

12. The method of claim 11 wherein said independent optical amplification stages comprise at least 2 independent optical Erbium-doped fiber amplification stages and said plurality of pumps comprises at least 2 pumps.

13. The method of claim 11 further comprising adjusting gain tilt of at least one of said sub-bands using a gain flattening filter after said first optical Erbium-doped fiber amplification stage.

14. The method of claim 11 further comprising monitoring signal reception in each of said sub-bands prior to amplification in said first optical Erbium-doped fiber amplification stage.

15. The method of claim 11 further comprising:
   monitoring output power of one of said independent optical Erbium-doped fiber amplification stages; and
   controlling one of said plurality of pumps associated with said one of said independent optical Erbium-doped fiber amplification stages to regulate said monitored output power.

16. In an optical communication system apparatus for amplifying an optical signal, said apparatus comprising:
   means for amplifying multiple sub-bands of a WDM signal in a common Erbium-doped fiber amplification stage;
   means for isolating said multiple sub-bands from one another after amplification by said means for amplifying multiple sub-bands;
   means for amplifying said multiple sub-bands separately in Erbium-doped fibers;
   means for providing pump energy comprising a plurality of pumps, each associated with a single sub-band and pumping optical energy into said common Erbium-doped fiber amplification stage and into said means for amplifying said multiple sub-bands separately.

17. The apparatus of claim 16 wherein said means for amplifying said multiple sub-bands separately comprises a plurality of independent Erbium-doped fiber amplification stages, each-pumped by one of said plurality-of pumps.

18. The apparatus of claim 16 further comprising means for adjusting gain tilt of at least one of said sub-bands.

19. The apparatus of claim 16 further comprising means for monitoring signal reception in each of said sub-bands prior to amplification in said common optical Erbium-doped fiber amplification stage.

20. The apparatus of claim 16 further comprising:
means for monitoring output power of one of said sub-bands; and
means for controlling one of said plurality of pumps associated with said one of said sub-bands to regulate said monitored output power.

* * * * *